(12) United States Patent
Wang et al.

(10) Patent No.: US 10,277,790 B2
(45) Date of Patent: Apr. 30, 2019

(54) FULL-RANGE IMAGE DETECTING SYSTEM AND METHOD THEREOF

(71) Applicant: INDUSTRIAL TECHNOLOGY RESEARCH INSTITUTE, Hsinchu (TW)

(72) Inventors: Hau-Wei Wang, Taipei (TW); Chun-Hsien Chen, Jhubei (TW); Chung-Ning Huang, Hsinchu (TW); Po-Yi Chang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 225 days.

(21) Appl. No.: 14/978,482

(22) Filed: Dec. 22, 2015

(65) Prior Publication Data

US 2016/0344911 A1    Nov. 24, 2016

Related U.S. Application Data

(60) Provisional application No. 62/164,671, filed on May 21, 2015.

(30) Foreign Application Priority Data

Oct. 8, 2015 (TW) .............................. 104133182 A

(51) Int. Cl.
*H04N 5/225* (2006.01)
*G06T 7/00* (2017.01)
*G06T 7/521* (2017.01)
(Continued)

(52) U.S. Cl.
CPC ............. *H04N 5/2256* (2013.01); *G01C 3/32* (2013.01); *G02B 7/285* (2013.01); *G06T 7/521* (2017.01);
(Continued)

(58) Field of Classification Search
CPC .................. H04N 5/2256; G06T 7/521; G06T 2207/10056; G06T 2207/30148; G01C 3/32; G02B 7/28
(Continued)

(56) References Cited

U.S. PATENT DOCUMENTS 4,641,972 A    2/1987  Halioua et al.
4,847,511 A    7/1989  Takada et al.
(Continued)

FOREIGN PATENT DOCUMENTS

CN    101711354 A    5/2010
CN    101782525 A    7/2010
(Continued)

OTHER PUBLICATIONS

Po-Yi Chang et al., "Wafer level warpage characterization of 3D interconnect processing wafers", Proc. of SPIE vol. 8324, Apr. 5, 2012.
(Continued)

*Primary Examiner* — Christopher S Kelley
*Assistant Examiner* — Matthew K Kwan
(74) *Attorney, Agent, or Firm* — Rabin & Berdo, P.C.

(57) ABSTRACT

A full-range image detecting system including a planar light source, an image capturing device, a light sensing device, a processing unit and a measuring module is provided. The planar light source projects a photo image with periodical variations onto an object. The image capturing device captures a reflective photo image reflected from the object. The light sensing device detects the coordinates of at least three measuring points on the object for fitting a plane. The processing unit calculates a phase variation of the reflective photo image after phase shift, a relative altitude of the surface profile of the object according to the phase variation, and an absolute altitude of the surface profile of the object
(Continued)

with respect to the plane to obtain an information of absolute coordinate. The measuring module detects the surface of the object according to the information of absolute coordinate of the object.

14 Claims, 4 Drawing Sheets

(51) Int. Cl.
*G01C 3/32* (2006.01)
*G02B 7/28* (2006.01)
(52) U.S. Cl.
CPC ............... *G06T 2207/10056* (2013.01); *G06T 2207/30148* (2013.01)
(58) Field of Classification Search
USPC .......................................................... 348/95
See application file for complete search history.

(56) References Cited

U.S. PATENT DOCUMENTS

| 5,539,676 | A | 7/1996 | Yamaguchi |
| 6,597,460 | B2 | 7/2003 | Groot et al. |
| 7,477,401 | B2 | 1/2009 | Marx et al. |
| 8,743,374 | B2 | 6/2014 | Nakatsukasa |
| 8,885,176 | B2 | 11/2014 | Tabuchi |
| 2013/0135715 | A1 | 5/2013 | Chen et al. |
| 2015/0286053 | A1* | 10/2015 | Hu ...................... G02B 27/0101 349/11 |

FOREIGN PATENT DOCUMENTS

| CN | 102305601 A | 1/2012 |
| JP | 2004-317495 A | 11/2004 |
| JP | 2006-284193 A | 10/2006 |
| TW | I287079 B | 9/2007 |
| TW | 200839220 A | 10/2008 |
| TW | I327348 B | 7/2010 |
| TW | I458964 B | 11/2014 |
| WO | WO 2007-059088 A2 | 5/2007 |
| WO | WO 2010-107434 A1 | 9/2010 |

OTHER PUBLICATIONS

Taiwanese Office Action dated Aug. 25, 2016.
Chinese Office Action dated May 30, 2018.

* cited by examiner

FULL-RANGE IMAGE DETECTING SYSTEM AND METHOD THEREOF

This application claims the benefits of U.S. provisional application Ser. No. 62/164,671, filed May 21, 2015 and Taiwan application Serial No. 104133182, filed Oct. 8, 2015, the subject matters of which are incorporated herein by references.

TECHNICAL FIELD

The disclosure relates in general to a detecting system, and more particularly to a full-range image detecting system and method thereof.

BACKGROUND

Along with the trend of wafer thinning, wafer warpage and deformation has reached millimeter level. However, when warpage volume increases but the focus range is not large enough and the focusing speed is not fast enough, the focusing of the automatic optical inspection (AOI) system will become more difficult and the detecting time will be prolonged. Consequently, the AOI system will have poor performance in detection, and subsequent manufacturing processes will be affected.

Of the current technologies, the focusing mode mainly includes an active focus mode and a passive focus mode. The focusing process of the passive focus mode includes a coarse tuning stage and a fine tuning stage. In the active focus mode, the light generated by a light source is projected onto a focusing grating and then is further projected on the surface of an object via a lens. A phase comparison between the grating image reflected from the surface of the object and the original grating image is made to increase the focusing speed. However, the active focus mode incurs a higher cost.

SUMMARY

The disclosure is directed to a full-range image detecting system and method thereof, which resolve the problems encountered in the prior art, improve the detection of the full-range image and increase the speed and accuracy of detection.

According to one exemplary embodiment, a full-range image detecting system including a planar light source, an image capturing device, a light sensing device, a processing unit and a measuring module is provided. The planar light source projects a photo image with periodical variations onto an object. The image capturing device captures a reflective photo image reflected from the object. The light sensing device detects the coordinates of at least three measuring points on the object for fitting a plane. The processing unit calculates the phase variation of the reflective photo image after phase shift, a relative altitude of the surface profile of the object according to the phase variation, and an absolute altitude of the surface profile of the object with respect to the plane to obtain an information of absolute coordinate. The measuring module detects the surface of the object according to the information of absolute coordinate of the object.

According to another exemplary embodiment, a full-range image detecting method includes following steps is provided. A photo image with periodical variations is projected onto an object by a planar light source. A reflective photo image reflected from the object is captured. The coordinates of at least three points on the object are detected for fitting a plane. The phase variation of the reflective photo image after phase shift is calculated, and then a relative altitude of the surface profile of the object is calculated according to the phase variation. An absolute altitude of the surface profile of the object with respect to the plane is calculated to obtain an information of absolute coordinate. The surface of the object is detected according to the information of absolute coordinate.

The above and other aspects of the disclosure will become better understood with regard to the following detailed description of the preferred but non-limiting embodiment(s). The following description is made with reference to the accompanying drawings.

Figure 1:
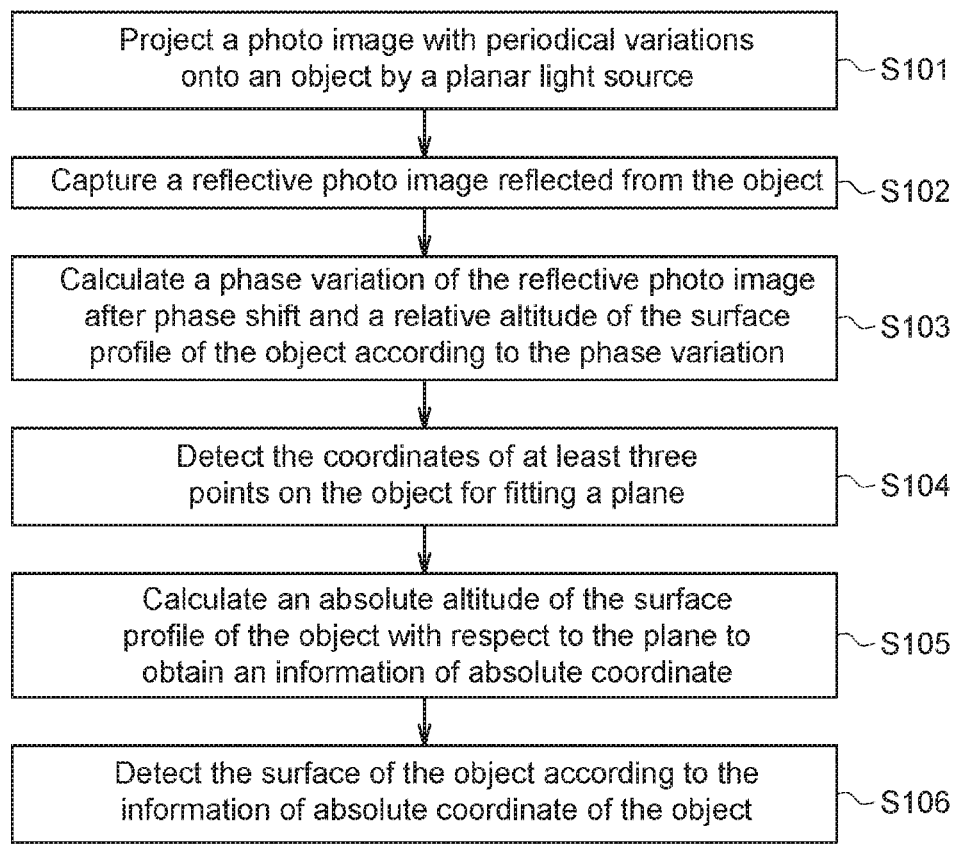
FIG. 1 is a flowchart of a full-range image detecting method according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to the full-range image detecting system and method of the disclosure, a relative altitude of a surface profile of an object (such as a wafer) is measured, and the information of reference coordinate (such as the circle center position, the alignment-groove position and the rotation angle of the wafer and the resolution of the image) is outputted and used as the movement information for a measuring module (such as an optical microscope or an optical interferometer) and a positioning platform to reduce the focusing time, such that the measuring module perform quick detection point by point.

Let the surface detection of a wafer be taken for example. Firstly, a relative altitude of the surface profile of the wafer is measured. Then, the relative altitude of the surface profile of the wafer and a reference coordinate information are provided to the measuring module, such that the coarse tuning and fine tuning in the focusing process of a conventional measuring module be omitted, the fine scanning process be shortened, and the focusing problems arising from wafer warpage is resolved.

A number of embodiments are disclosed below for elaborating the disclosure. However, the embodiments of the disclosure are for detailed descriptions only, not for limiting the scope of protection of the disclosure.

Referring to FIG. 1, a flowchart of a full-range image detecting method according to an embodiment of the disclosure is shown. The full-range image detecting method of the present embodiment includes following steps: In step S101, a photo image with periodical variations is projected onto an object by a planar light source. In step S102, a reflective photo image reflected from the object is captured. In step S103, a phase variation of a phase-shifting reflective photo image is calculated, and a relative altitude of the surface profile of the object is calculated according to the phase variation. In step S104, the coordinates of at least three points on the object are detected for fitting a plane. In step S105, an absolute altitude of the surface profile of the object with respect to the plane is calculated to obtain an information of absolute coordinate. In step S106, the surface of the object is detected according to the information of absolute coordinate of the object.

Figure 2:
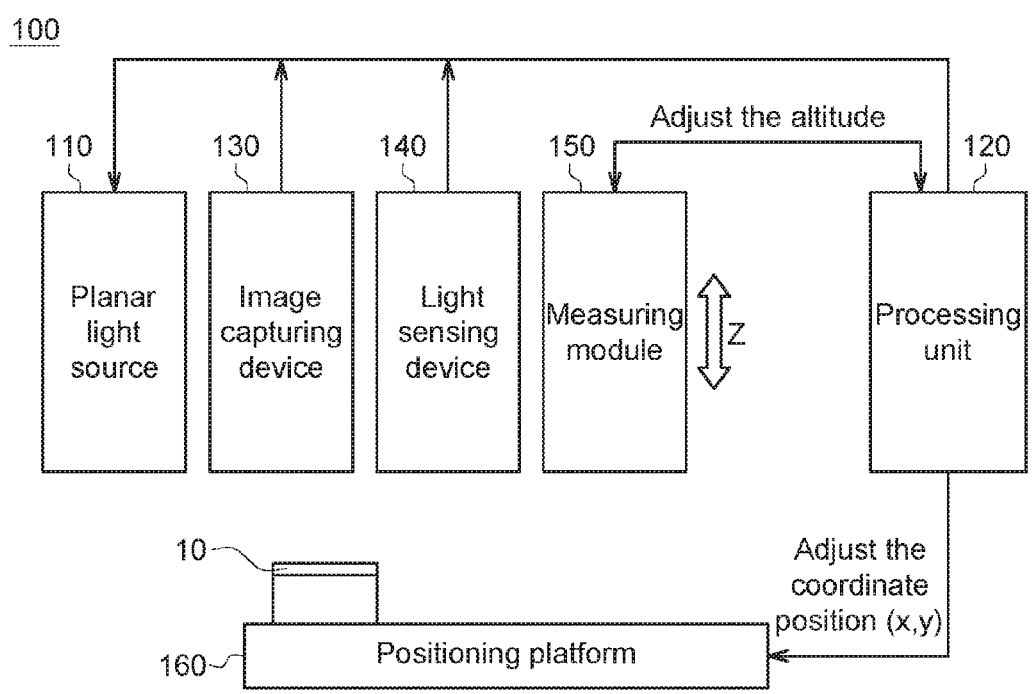
FIG. 2 is a schematic diagram of a full-range image detecting system according to an embodiment of the disclosure.

Referring to FIG. 2, a schematic diagram of a full-range image detecting system according to an embodiment of the disclosure is shown. According to the steps S101~S106 above, the full-range image detecting system 100 includes a planar light source 110, a processing unit 120, an image capturing device 130, a light sensing device 140, a measuring module 150 and a positioning platform 160. The positioning platform 160 carries an object 10, such as a wafer or a semiconductor substrate. The disposition and details of the planar light source 110, the processing unit 120 and the image capturing device 130 is obtained with reference to FIG. 3 and FIG. 4. Steps S101~S103 of FIG. 1 are exemplified by the full-range image detecting device 101 of FIG. 3 as below.

Figure 3:
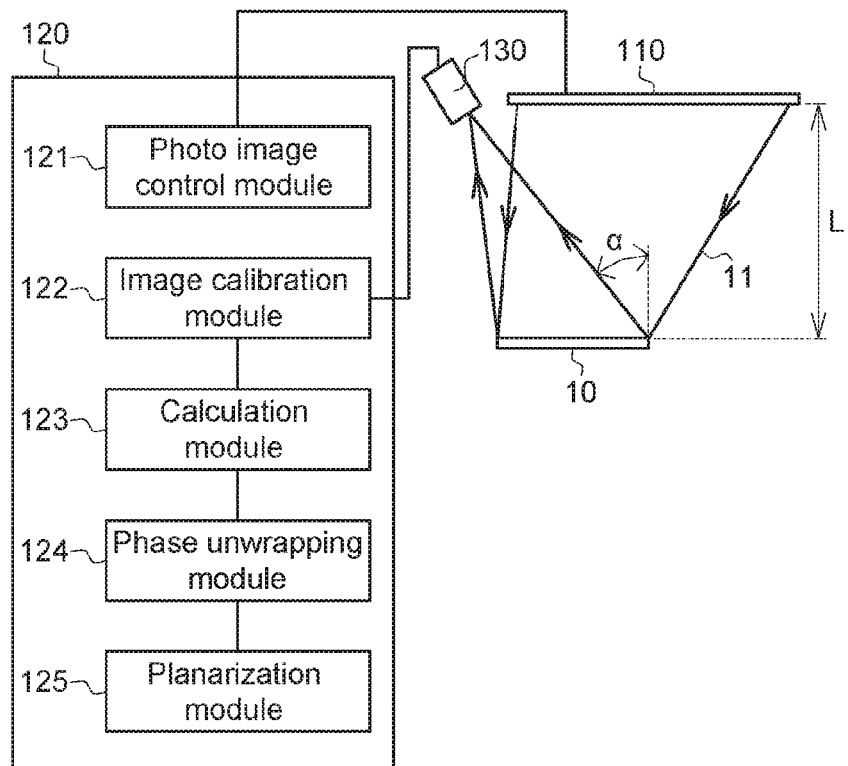
FIG. 3 is a schematic diagram of a full-range image detecting device according to an embodiment of the disclosure.

Refer to FIG. 3. The processing unit 120, such as a computer or an integrated circuit, includes a photo image control module 121, an image calibration module 122, a calculation module 123, a phase unwrapping module 124 and a planarization module 125. In step S101, the planar light source 110 projects a photo image 11 with periodical variations (referring to FIG. 4) onto an object 10, and the photo image 11 be reflected by the object 10 to form a reflective photo image. The reflective photo image has the same periodical variations with the photo image 11 projected on the object 10. The only difference between the reflective photo image and the photo image 11 is disclosed below. When the surface of the object 10 is free of slope change, the reflective photo image will not be offset or deformed like the photo image 11. However, when the surface of the object 10 has tiny slope changes, the reflective photo image will be offset and deformed, and the offset δy of the reflective photo image will be positively proportional to the slope change on the surface of the object 10. The relationship is expressed as equation (1):

$$\delta y = L[\tan(\alpha+2\theta) - \tan(\alpha)] \quad (1)$$

Wherein,
L: denotes a distance between the planar light source 110 and the object 10;
α: denotes an angle at which the image capturing device 130 captures an image;
θ: denotes a slope change on the surface of the object 10.

When the slope change θ on the surface of the object 10 is very tiny, equation (1) be simplified as:

$$\delta y = 2L\theta \sec^2 \alpha \quad (2)$$

Therefore, the slope change θ on the surface of the object 10 be calculated from the offset δy of the reflective photo image.

Figure 4:
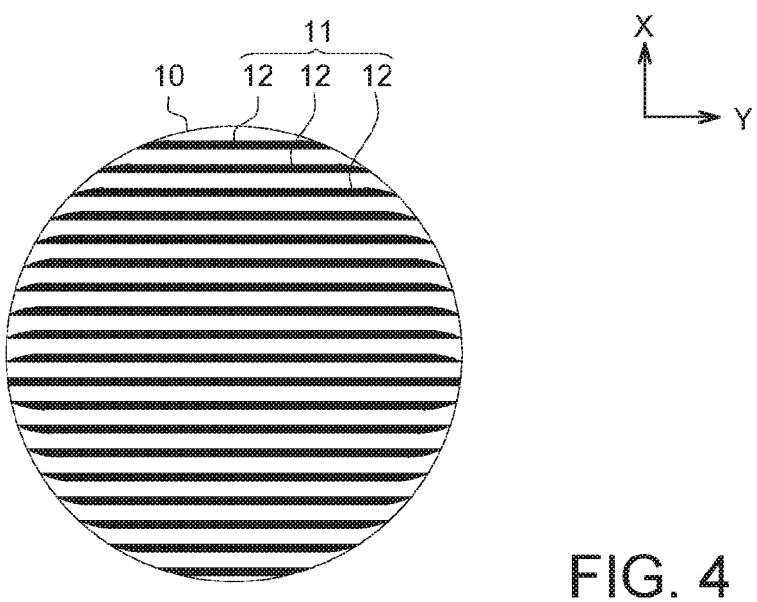
FIG. 4 is a photo image according to an embodiment of the disclosure.

Refer to the photo image 11 of FIG. 4. The photo image 11 is formed of long stripes 12 with periodical variations. In another embodiment, the photo image is formed of circles with periodical variations in a concentric shape. The alternating bright/dark images (such as black/white strips 12) are generated on a planar light source 110 through signal processing of a sine wave or a square wave with period 2π. Then, the alternating bright/dark images are further projected onto the object 10 by the planar light source 110 to form the photo image 11 with periodical variations. The planar light source 110 is realized by a flat display which receives a control signal from the photo image control module 121. Then, the bright/dark status of the pixel units of the flat display is determined to generate the required photo image 11. In an embodiment, the width of each stripe 12 is determined according to the number of corresponding pixel units, and is about 10~20; the transmittance of the liquid crystal molecules of corresponding pixel units is controlled to determine whether the generated stripe is bright or dark.

In step S102, the photo image control module 121, which is a programmable control module, generates a photo image 11 and controls the photo image 11 to move at an equal distance with respect to the object 10 along at least a direction to generate phase shift. For example, the photo image is moved at an equal distance by using three-step phase-shifting method or four-step phase-shifting method to generate multiple photo images (such as 6 or 8). As indicated in FIG. 4, the moving direction of the photo image 11 is the arrangement direction of the long stripes 12 (the X direction). As indicated in FIG. 2, after a predetermined number of phase-shifting photo images are generated, the image capturing device 130 sequentially capture the reflective photo images, and the image calibration module 122 will subsequently calibrate the distortion of the reflective photo images. Besides, to obtain a 2D phase chart, the photo image control module 121 respectively generate two orthogonal photo images, and each photo image is moved along the X direction or the Y direction to generate phase shift in different directions. In an embodiment, the photo images are not necessarily orthogonal to each other, and the angle formed between the two photo images does not have to be 90°.

In the above disclosure, the three-step phase-shifting method requires three photo images with phase shift. The phase shift between the first image $I_1$ and the second image $I_2$ is 2π/3. The phase shift between the second image $I_2$ and the third image $I_3$ is 4π/3. The phase-shift relationship be expressed as a set of simultaneous equations:

$$I_1 = I_0 + A\cos\phi$$

$$I_2 = I_0 + A\cos\left(\phi - \frac{2\pi}{3}\right)$$

$$I_3 = I_0 + A\cos\left(\phi - \frac{4\pi}{3}\right)$$

$$\phi(x,y) = \tan^{-1}\left(\frac{\sqrt{3}(I_2 - I_3)}{2I_1 - I_2 - I_3}\right)$$

Wherein, $I_0$: denotes an intensity of an ambient light;

A: denotes amplitude of a wave;

φ: denotes a phase value of each coordinate point (x, y) of a photo image.

Besides, the four-step phase-shifting method requires four stripe images with phase shift. The phase shift between the first image $I_1$ and the second image $I_2$ is π/2. The phase shift between the second image $I_2$ and the third image $I_3$ is π. The phase shift between the third image $I_3$ and the fourth image $I_4$ is 3π/2. The phase-shift relationship is expressed as a set of simultaneous equations:

$$I_1 = I_0 + A\cos\phi$$
$$I_2 = I_0 + A\cos\left(\phi - \frac{\pi}{2}\right)$$
$$I_3 = I_0 + A\cos(\phi - \pi)$$
$$I_4 = I_0 + A\cos\left(\phi - \frac{3\pi}{2}\right)$$
$$\phi(x,y) = \tan^{-1}\left(\frac{I_2 - I_4}{I_1 - I_3}\right)$$

Wherein, $I_0$: denotes an intensity of an ambient light;

A: denotes amplitude of a wave;

φ: denotes a phase value of each coordinate point (x, y) of a photo image.

As disclosed above, the phase variation Δφ of each coordinate point (x, y) is positively proportional to the offset δy of the reflective photo image. In step S103, the calculation module 123 of FIG. 2 calculates the phase variation Δφ of each coordinate point (x, y) of the images to obtain the surface profile of the object 10. The phase variation Δφ be substituted to equation (2), and the offset δy of the reflective photo image be expressed as:

$$\delta y = \frac{\Delta\phi}{2\pi}p = 2L\theta\sec^2\alpha \qquad (3)$$
$$\theta = \frac{\Delta\phi \cdot p}{4\pi L\sec^2\alpha}$$

Wherein,

P: denotes a period of a reflective photo image

As indicated in equation (3), the slope change θ on the surface of the object 10 is obtained from the phase variation Δφ. Both the three-step phase-shifting method and the four-step phase-shifting method disclosed above are based on the arctangent ($\tan^{-1}$) function, and the phase is restricted between −π/2~π/2, therefore the phase chart is a discontinuous phase distribution chart. To restore the discontinuous phase as the original continuous phase with 0~Nπ periods (N is an integer), the phase needs to be unwrapped.

Refer to FIG. 3. The phase unwrapping module 124 performs phase unwrapping computation on the phase value of each coordinate point to obtain a phase unwrapping chart. In short, to unwrap the phase, a specific mathematic algorithm is used to eliminate the truncated lines in the phase chart by adding the difference to or subtracting the difference from two adjacent phases whose phase difference exceeds a threshold, such that the phases become continuous. Therefore, the phase value of each coordinate point in the photo image is obtained by using a phase shifting and unwrapping method.

Then, the planarization module 125 plenaries a phase unwrapping chart to obtain a relative altitude of the surface profile of the object 10. In short, the planarization process brings the phase of each coordinate point to the same level such that variation in phase is compared and a relative altitude of the surface profile of the object 10 is calculated. The relative altitude of each coordinate point of the object 10 is denoted by Wi (x, y, z).

Figure 5:
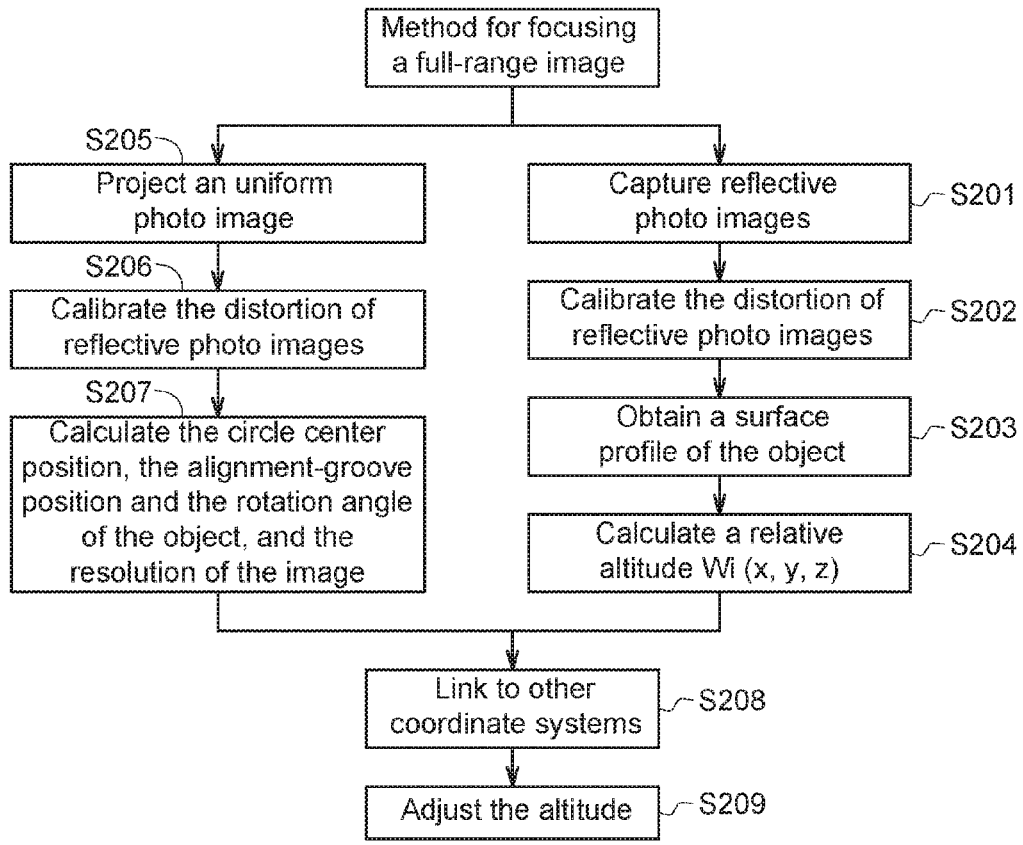
FIG. 5 is a flowchart of a method for focusing a full-range image according to an embodiment of the disclosure

Referring to FIG. 5, a flowchart of a method for focusing a full-range image according to an embodiment of the disclosure is shown. Steps S201~S204 are similar to steps S101~S103 disclosed above. In step S201, photo images with periodical variations are generated through the projection of a planar light source 110, and then reflective photo images with periodical variations are captured. In step S202, the distortion of the reflective photo image is calibrated, such that an inclined projection of the photo image onto an object 10 is calibrated as an orthographic projection of the photo image onto the object 10. In step S203, a phase variation of each phase-shifting reflective photo image is calculated to obtain the surface profile of the object 10. In step S203, a relative altitude of the surface profile of the object 10 is calculated according to the phase unwrapping and is denoted by Wi (x, y, z).

Figure 6:
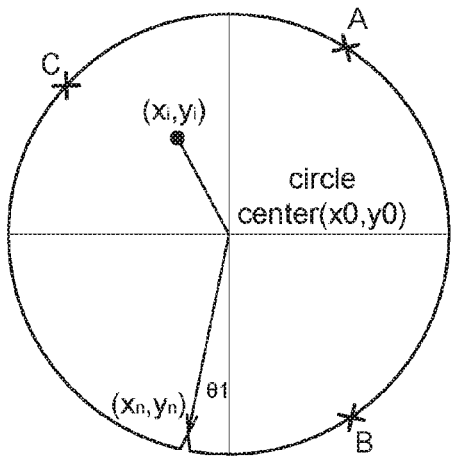
FIG. 6 is a schematic diagram of a circle center position, an alignment-groove position and a rotation angle of an object.

Steps S205~S207 are similar to step S104 disclosed above. In step S205, a uniform photo image (without periodical variation strips 12) is projected onto the object 10 by the planar light source 110, and a reflected uniform photo image is captured by the image capturing device 130. In step S206, the distortion of the reflected uniform photo image is calibrated such that such that an inclined projection of the uniform photo image onto the object 10 is calibrated as an orthographic projection of the uniform photo image onto the object 10. Then, a plane is fitted according to the coordinates of at least three measuring points on the object 10. Refer to FIG. 6. In step S207, coordinate information, such as the circle center position ($x_o$, $y_o$), the alignment-groove position ($x_n$, $y_n$) and the rotation angle θ1 of the object 10 and the resolution of the image, are calculated by the processing unit 120 to obtain a plane coordinate system of the object 10 according to the plane fitted by the coordinate positions of three measuring points A, B, and C. The device used for detecting relative coordinates of at least three measuring points A, B, and C on the object 10 is a laser sensor or other light sensing device 140 with optical positioning function as indicated in FIG. 2.

In step S208, the circle center position ($x_o$, $y_o$) and the resolution of the image are used for linking the plane coordinate system of the object 10 to other coordinate system (such as the coordinate system of the positioning platform 160 and the coordinate system of the measuring module 150). Additionally, the rotation angle θ1 of the alignment groove is used for calibrating the error in the rotation angle when the object 10 is placed. In step S209, the altitude of the measuring module 150 is adjusted according to the information of absolute coordinate of the object for detecting the surface of the object 10. As indicated in FIG. 2, the processing unit 120 control the positioning platform 160 to move the object 10 to a coordinate position (x, y) according to the information of absolute coordinate of the object, and the measuring module 150 adjust an altitude Z according to the information of absolute coordinate of the object to adjust a focal length between the optical microscope or the optical interferometer and object 10. In another embodiment, when the measuring module 150 includes a probe card electrical testing device, the altitude of the probe card be adjusted according to the information of absolute coordinate of the object for enabling the probe card electrical testing device to electrically contact the object 10.

The algorithm related to the information of absolute coordinate is disclosed below. In step S105, after the processing unit 120 obtains the relative coordinates of three measuring points A, B, and C, the coordinate positions of the three measuring points are used for fitting a plane Q (x, y, z), and surface overlapping computation is performed on a relative altitude Wi (x, y, z) of the surface profile of the object 10 and the plane Q (x, y, z) to calculate an absolute altitude of the surface profile of the object 10 with respect to the plane Q (x, y, z) to obtain an information of absolute coordinate of the object. The information of absolute coordinate is used as the coordinates (x, y, z) of actual absolute altitude Zi on the surface of the object 10.

Wherein, $$Zi(x,y,z)=Wi(x,y,z)+Q(x,y,z)-P(xi,yi,zi);$$

P (xi, yi, zi) denotes the coordinates of a reference coordinate point (such as one of the three measuring points A, B, and C) of the coordinate system of absolute altitudes.

In step S106, after the measuring module 150 obtains the information of absolute coordinate, the measuring module 150 detect, focus, or perform an electrical test on the surface of the object 10 according to the information of absolute coordinate of the object. The measuring module 150 is an optical microscope, an optical interferometer or a probe card electrical testing device. In the present embodiment, after the full-range image detecting system 100 calibrates the absolute altitude between multiple points $(x_i, y_i)$ of the object 10 and the measuring module 150 according to the altitude information of the image, the processing unit 120 control the measuring module 150 to move along the vertical axis and reach a destined position directly without employing coarse tuning, hence saving the focusing time or the positioning time.

According to the full-range image detecting system and method of the embodiments of the disclosure, the processing unit controls the positioning platform to move the object to a coordinate position according to the information of absolute coordinate of the object, and the measuring module move in the vertical axis of the altitude and directly reach a destined position according to the information of absolute coordinate of the object, such that the focusing speed is very fast and the measuring points be quickly detected one by one. The present system employs a focusing process quicker than that of the passive focus mode which includes a coarse tuning stage and a fine tuning stage, and incurs cost lower than the active focus mode, hence breaking through the bottleneck of conventional technologies. Additionally, the present system measures the profile (such as bump altitude distribution), the defects and the warpage on the surface of the object to meet different needs of the system.

It will be apparent to those skilled in the art that various modifications and variations be made to the disclosed embodiments. It is intended that the specification and examples be considered as exemplary only, with a true scope of the disclosure being indicated by the following claims and their equivalents.

What is claimed is:

1. A full-range image detecting system, comprising:
   a flat display providing a source of planar light projecting a photo image with periodical variations onto an object, wherein the photo image includes at least three photo images that are phase-shifted relative to each other;
   an image capturing device capturing a reflective photo image reflected from the object;
   a light sensing device detecting coordinates of at least three points on the object for fitting a plane;
   a processing unit calculating a phase variation of the reflective photo image after phase shift, a relative altitude of the surface profile of the object according to the phase variation, and an absolute altitude of the surface profile of the object with respect to the plane to obtain an information of absolute coordinate of the object; and
   a measuring module detecting the surface of the object according to the information of absolute coordinate of the object wherein a phase variation of each coordinate point of each of the at least three photo images is positively proportional to an offset representing a slope of a surface of the object, the offset being calculated based on a distance between the flat display and the object, an angle at which the image capturing device captures the reflective photo image, and a slope change of the surface of the object.

2. The full-range image detecting system according to claim 1, further comprising a positioning platform which carries the object, and further moves the object to a coordinate position according to the information of absolute coordinate of the object.

3. The full-range image detecting system according to claim 1, wherein the planar light source projects a uniform photo image to the object, and the processing unit obtains a coordinate information in a plane coordinate system according to the fitted plane.

4. The full-range image detecting system according to claim 1, wherein the measuring module comprises an optical microscope or an optical interferometer.

5. The full-range image detecting system according to claim 4, wherein the optical microscope or the optical interferometer adjusts a focal length between the optical microscope or the optical interferometer and the object through the adjusting in altitude according to the information of absolute coordinate of the object.

6. The full-range image detecting system according to claim 1, wherein the measuring module comprises a probe card electrical testing device.

7. The full-range image detecting system according to claim 6, wherein the measuring module adjusts an altitude of the probe card according to the information of absolute coordinate of the object for enabling the probe card electrical testing device to electrically contact the object.

8. The full-range image detecting system according to claim 1, wherein a phase value of each coordinate point of a photo image among the at least three photo images is based on an intensity of ambient light and an amplitude of a wave of a respective one of the at least three photo images.

9. A full-range image detecting method, comprising:
   projecting from a flat display as a source of planar light, a photo image with periodical variations onto an object, wherein the photo image includes at least three photo images that are phase-shifted relative to each other;
   capturing a reflective photo image reflected from the object;
   calculating a phase variation of the reflective photo image after phase shift and a relative altitude of the surface profile of the object according to the phase variation;
   detecting the coordinates of at least three points on the object for fitting a plane;
   calculating an absolute altitude of the surface profile of the object with respect to the plane to obtain an information of absolute coordinate; and detecting the surface of the object according to the information of absolute coordinate of the object wherein a phase variation of each coordinate point of each of the at least three photo images is positively proportional to an offset representing a slope of a surface of the object, the offset being calculated based on a distance between the flat display and the object, an angle at which the image capturing device captures the reflective photo image, and a slope change of the surface of the object.

10. The full-range image detecting method according to claim 9, further comprising carrying the object by a positioning platform, and controlling the positioning platform to move the object to a coordinate position according to the information of absolute coordinate of the object.

11. The full-range image detecting method according to claim 9, further comprising projecting a uniform photo image to the object by the planar light source and obtaining a coordinate information of the object in a plane coordinate system according to the fitted plane.

12. The full-range image detecting method according to claim 9, wherein when the object is detected by using an optical microscope or an optical interferometer, further comprises adjusting a focal length between the optical microscope or the optical interferometer and the object through the adjusting in altitude according to the information of absolute coordinate of the object.

13. The full-range image detecting method according to claim 9, wherein when the object is detected by using a probe card electrical testing device, further comprises adjusting an altitude of the probe card according to the information of absolute coordinate of the object for enabling the probe card electrical testing device to electrically contact the object.

14. The full-range image detecting method according to claim 9, wherein a phase value of each coordinate point of a photo image among the at least three photo images is based on an intensity of ambient light and an amplitude of a wave of a respective one of the at least three photo images.

* * * * *